United States Patent
Chatterjee et al.

(10) Patent No.: US 8,621,166 B1
(45) Date of Patent: Dec. 31, 2013

(54) EFFICIENT BACKUP OF MULTIPLE VERSIONS OF A FILE USING DATA DE-DUPLICATION

(75) Inventors: Paresh Chatterjee, Fremont, CA (US);
Raja Jayaraman, Fremont, CA (US);
Loganathan Ranganathan, Fremont, CA (US); Venugopal Reddy Mallavaram, Fremont, CA (US)

(73) Assignee: American Megatrends, Inc., Norcross, GA (US)

( * ) Notice: Subject to any disclaimer, the term of this patent is extended or adjusted under 35 U.S.C. 154(b) by 566 days.

(21) Appl. No.: 12/698,308

(22) Filed: Feb. 2, 2010

Related U.S. Application Data

(60) Provisional application No. 61/150,967, filed on Feb. 9, 2009.

(51) Int. Cl.
*G06F 12/00* (2006.01)
(52) U.S. Cl.
USPC .................................. 711/162; 711/E12.103
(58) Field of Classification Search
USPC .......................................... 711/162, E12.103
See application file for complete search history.

(56) References Cited

U.S. PATENT DOCUMENTS

| | | | | |
|---|---|---|---|---|
| 5,634,052 A | * | 5/1997 | Morris | 707/640 |
| 2008/0243953 A1 | * | 10/2008 | Wu et al. | 707/204 |
| 2009/0083563 A1 | * | 3/2009 | Murase | 713/324 |
| 2009/0177855 A1 | * | 7/2009 | Drews et al. | 711/162 |

* cited by examiner

*Primary Examiner* — Larry Mackall
(74) *Attorney, Agent, or Firm* — Meunier Carlin & Curfman, LLC

(57) ABSTRACT

Technologies are described herein for providing efficient backup of multiple versions of a data file using data de-duplication. A CDP module copies blocks of data of a specific block size from a current version of the data file to a master file maintained in a backup location for the data file. Only blocks of data not matching a unique data block already in the master file are copied. The CDP module then creates an anterior file in the backup location for the current version of the data file containing an ordered list of references to the unique data blocks in the master file. The order of the list of references is based on the order of occurrence of each unique data block in the modified version of the data file. Finally, the CDP module creates a posterior file in the backup location for the current version of the data file containing any remaining block of data in the data file that is less than the specific block size.

14 Claims, 8 Drawing Sheets

EFFICIENT BACKUP OF MULTIPLE VERSIONS OF A FILE USING DATA DE-DUPLICATION

CROSS-REFERENCE TO RELATED APPLICATION

This application claims the benefit of U.S. provisional patent application No. 61/150,967, filed on Feb. 9, 2009, entitled "File-based De-duplication for Maintaining Multiple File Versions in Backup and Continuous Data Protection Solutions," which is expressly incorporated herein by reference in its entirety.

BACKGROUND

Continuous data protection ("CDP"), also called continuous backup, generally refers to the backup of data on a computer by automatically saving a copy of every change made to that data. While traditional backup solutions take a snapshot of the files or data on a computer at a specific time, CDP essentially captures every new version of the data saved on the computer in real-time. CDP may be performed at the file-level or the device-level. Device-level CDP generally allows a user or administrator to roll back the entire state of the device, such as a disk drive, to any point in time, while file-level CDP may allow a user to view and select a specific version of a particular data file to restore.

File-level CDP is typically implemented through a service executing on a computer that monitors specified files and folders stored on local or remote storage volumes. When a monitored data file is changed, the new, modified version of the file is copied to a backup location. Saving multiple versions of protected files may provide administrators with the ability to recover a precise version of a data file given a requested recovery date and time. However, while each new version of a data file may only differ from the previous version by a small amount, traditional file-level CDP solutions may backup an entire copy of the modified version of the file. As a result, a small data file stored on the storage volume may occupy a disproportionately large amount of space in the backup location.

It is with respect to these considerations and others that the disclosure made herein is presented.

SUMMARY

Technologies are described herein for providing efficient backup of multiple versions of a data file using data de-duplication. Through the utilization of the technologies and concepts presented herein, a CDP module executing on a computer is able to monitor for changes made to a data file stored on a local or remote storage volume. When a change is detected, the CDP module stores the modified version of the data file in a backup location. The modified version of the data file is stored in a collection of files in the backup location using a data de-duplication technique to eliminate redundant data between the backed-up versions, thus reducing the storage resources required to maintain the file-based back-up as compared to traditional CDP or other backup solutions.

According to one embodiment, the CDP module copies blocks of data of a specific block size from the modified version of the data file to a master file maintained in the backup location for the data file. Only blocks of data not matching a unique data block already in the master file are copied. The CDP module then creates an anterior file in the backup location for the modified version of the data file containing an ordered list of references to the unique data blocks in the master file. The order of the list of references is based on the order of occurrence of each unique data block in the modified version of the data file. Finally, the CDP module creates a posterior file in the backup location for the modified version of the data file containing any remaining block of data in the data file that is less than the specific block size.

It should be appreciated that the above-described subject matter may also be implemented as a computer-controlled apparatus, a computer process, a computing system, or an article of manufacture, such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing efficient backup of multiple versions of a data file using data de-duplication. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof and that show, by way of illustration, specific embodiments or examples. In the accompanying drawings, like numerals represent like elements through the several figures.

Figure 1:
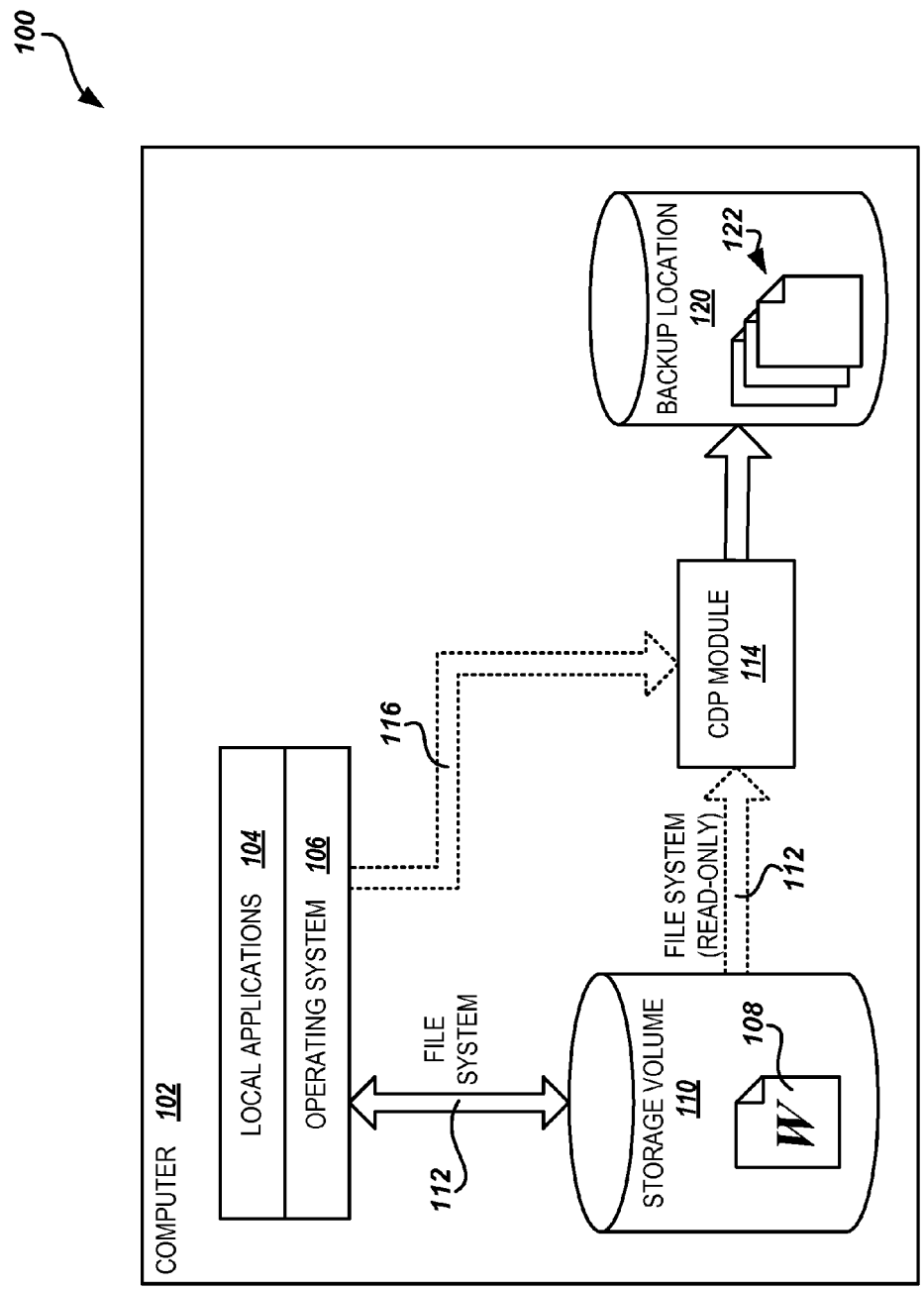
FIG. 1 is a block diagram showing aspects of an illustrative operating environment, including several software components provided by the embodiments presented herein.

FIG. 1 shows aspects of an illustrative operating environment 100 for the embodiments described herein, including a user computer 102. The user computer 102 may be a PC, a desktop workstation, a laptop, a notebook, a mobile device, a personal digital assistant ("PDA"), an application server, a Web server hosting Web-based application programs, or any other computing device. The user computer 102 executes local applications 104 and an operating system ("OS") 106 that read and write data files, such as the data file 108, stored on a storage volume 110.

The storage volume 110 may be located on a local storage device, such as a local hard drive, or the storage volume may be hosted on a remote storage system, such as a SAN volume or NAS volume accessed across a network (not shown) utilizing the appropriate protocol. The local applications 104 and the OS 106 may read and write data files 108 to the storage volume 110 utilizing a locally implemented file system 112, such as NTFS. It will be appreciated that the local applications 104 and an operating system 106 may utilize other file system 112 protocols to access the storage volume 110, including, but not limited to, the network file system ("NFS") protocol, the server message block ("SMB") protocol, and the like.

According to embodiments, the user computer 102 also includes a CDP module 114. The CDP module 114 executes on the user computer 102 and monitors specified files and folders on the storage volume 110 for changes in real-time. The CDP module 114 may provide facilities that allow users or administrators of the user computer 102 to specify which data files 108 on the storage volume 110 to monitor. The users or administrators may specify folder names, file names, file types, or any other specification of files to monitor.

In one embodiment, the CDP module 114 utilizes "hooks" 116 provided by the OS 106 or the file system 112 of the user computer 102 to be notified of changes in the specified data files 108. In another embodiment, the CDP module 114 monitors the storage volume 110 directly through the file system 112 to detect changes to the specified data files 108. When a monitored data file 108 is changed on the storage volume 110, the CDP module 114 initiates the storage of the modified version of the file to a backup location 120, as will be described in more detail below. The backup location 120 may be a local storage device, such as a local hard drive or tape drive, or the backup location may be hosted on a remote storage system, such as a SAN volume or NAS volume.

In a further embodiment, the CDP module 114 may backup the current version of each monitored data file 108 on the storage volume 110 on a periodic basis, regardless of whether the data file has been modified. The CDP module 114 may further provide facilities that allow the users or administrators of the user computer 102 to specify a schedule for periodic backups of the current versions of the monitored data files 108, and specify a maximum number of versions of each data file that are to be maintained in the backup location 120.

Figure 2A:
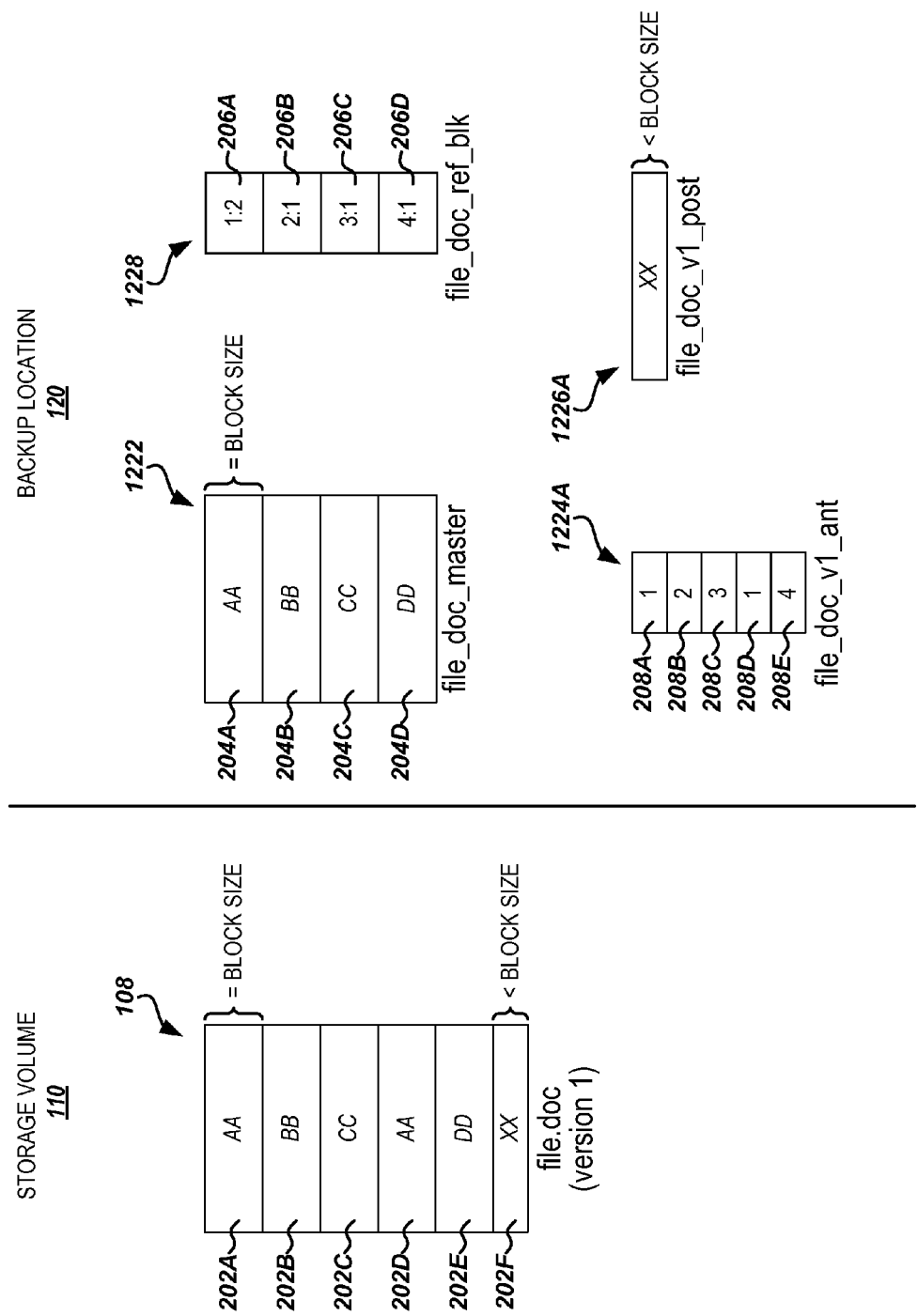
FIGS. 2A and 2B are block diagrams showing a mechanism for storing multiple versions of a data file using data de-duplication, according to embodiments presented herein.
Figure 2B:
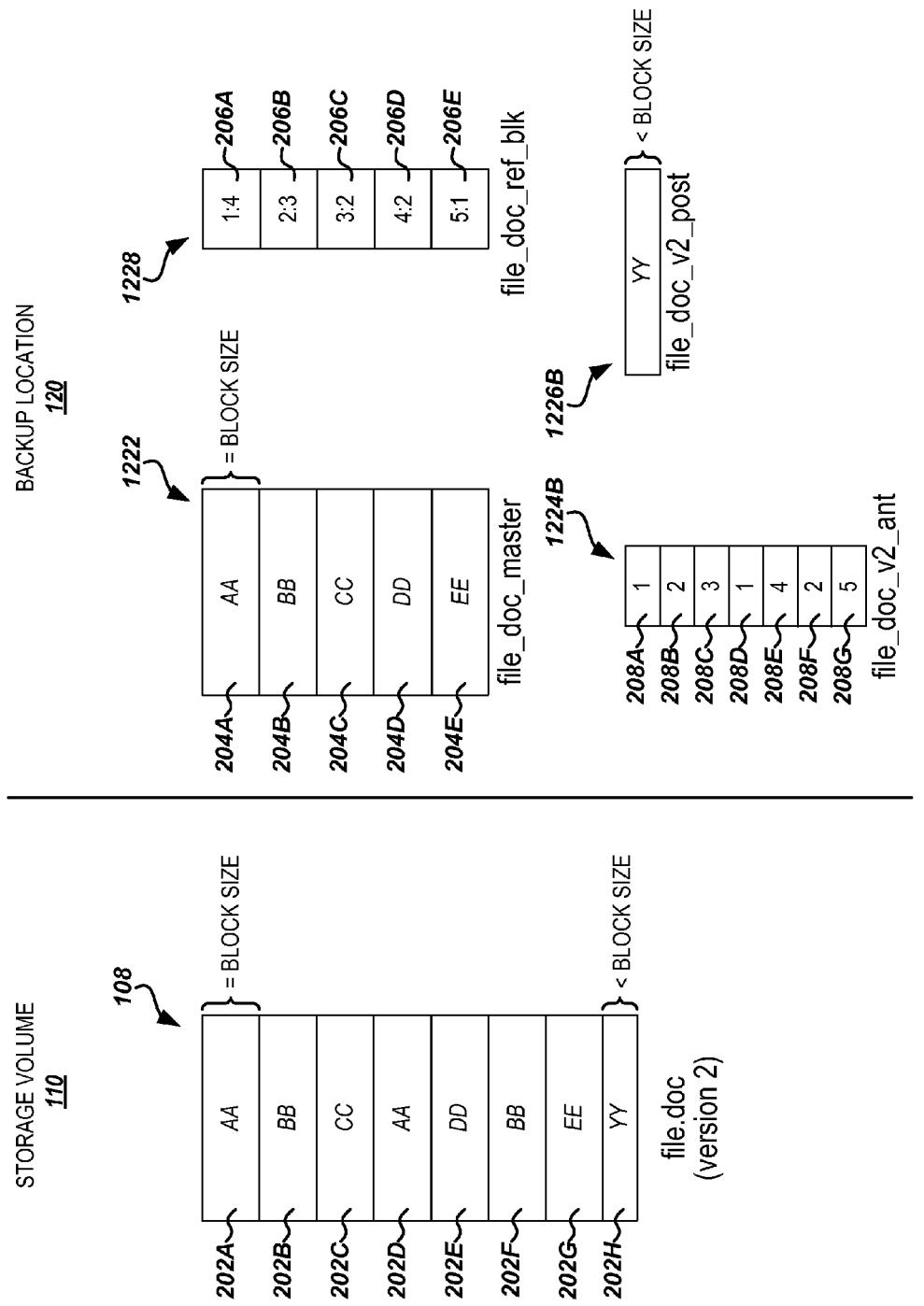

According to embodiments, the CDP module 114 maintains a collection of files 122 in the backup location 120 that stores the backed-up versions of the monitored data file 108. FIGS. 2A and 2B show additional details of the collection of files 122 utilized by the CDP module 114 to store multiple versions of the data file 108. According to one embodiment, for each monitored data file 108, the collection of files 122 maintained by the CDP module 114 includes a master file 1222 and a reference block file 1228. In addition, for each version of the data file 108, the collection of files 122 also includes an anterior file 1224A (also referred to herein generally as anterior file 1224) and a posterior file 1226A (also referred to herein generally as posterior file 1226).

In one embodiment, each of the files 1222, 1224A, 1226A, 1228 in the collection of files 122 is stored in the backup location 120 with a filename related to the name of the corresponding data file 108. For example, for a data file 108 with a filename of "file.doc," the corresponding master file 1222 may be named "file_doc_master," while the reference block file 1228 is named "file_doc_ref_blk," as shown in FIG. 2A. Similarly, the anterior file 1224A and posterior file 1226A may include an indication of the version in the filename, such as "file_doc_v1_ant" and "file_doc_v1_post," as further shown in FIG. 2A. It will be appreciated that the files 1222, 1224A, 1226A, 1228 in the collection of files 122 may be named using some other naming scheme, or may be linked to the corresponding data file 108 through a mechanism other than the filename, such as through a catalog file. It will be further appreciated that the master file 1222, reference block file 1228, anterior file 1224A, and posterior file 1226A may represent virtual files that are physically stored in the backup location 120 in a format other than files in a file system 112, such as rows in a database table. It is intended that this application include all such implementations of the collection of files 122.

The master file 1222 is common to all versions of the corresponding data file 108 and stores the unique data blocks 204A-204D from the data file. Each unique data block 204A-204D is stored only once in the master file 1222, even though the data block may occur multiple times in the original data file 108. For example, as shown in FIG. 2A the initial version of the data file 108 may consist of a number of blocks of data 202A-202E of a specific block size. The block size may be selected based on the file system 112 being utilized to allow efficient reading and writing of data while maximizing the de-duplication of data in the collection of files 122. For the NTFS file system, the block size may be 512 bytes, corresponding to the sector size of a standard PC hard disk. In addition, the version of the data file 108 may contain a "tail," or block of data less than the block size, such as the block of data 202F shown in FIG. 2A.

The master file 1222 corresponding to the data file 108 will contain a copy of each unique data block 204A-204D from the full blocks of data 202A-202E in the data file 108. As further shown in FIG. 2A, the unique data block 204A in the master file 1222 corresponds to blocks of data 202A and 202D in the data file 108, unique data block 204B corresponds to block of data 202B, unique data block 204C corresponds to block of data 202C, and unique data block 204D corresponds to block of data 202E. Storing only unique blocks of data in the master file 1222 reduces the storage space required as compared to simply copying the version of the data file 108 to the backup location 120. In addition, this technique provides even greater storage space savings when storing subsequent versions of the data file 108, as will become apparent from the description below.

The anterior file 1224A for the corresponding version of the data file 108 contains a list of references 208A-208E to the unique data blocks 204A-204D in the master file 1222 in the order of their occurrence in the data file 108. For example, the anterior file 1224A corresponding to the initial version of the data file 108 shown in FIG. 2A specifies that the data file consists of unique data block 204A, then unique data block 204B, unique data block 204C, unique data block 204A, and unique data block 204D. The posterior file 1226A for the corresponding version of the data file 108 contains the tail, or portion of the version of the data file less than the block size.

For example, the posterior file 1226A corresponding to the initial version of the data file 108 shown in FIG. 2A contains the block of data 202F from the data file.

The reference block file 1228 is common to all versions of the corresponding data file 108 and stores a reference count 206A-206D for each unique data block 204A-204D referenced in the anterior files 1224A for all versions of the data file stored in the backup location 120. For example, after storage of the initial version of the data file 108 to the backup location 120, the reference block file 1228 will contain a reference count 206A for the first unique data block 204A in the master file 1222 indicating that the unique data block is referenced two times, a reference count 206B for the second unique data block 204B indicating that the unique data block is referenced one time, a reference count 206C for the third unique data block 204C indicating that the unique data block is referenced one time, and a reference count 206D for the fourth unique data block 204D indicating that the unique data block is referenced one time, as further shown in FIG. 2A. If a unique data block 204A-204D becomes unreferenced after removal of old versions of the data file 108 from the backup location 120, the unreferenced data block may be reused to store another unique data block from a later version of the file, as will be described in more detail below in regard to FIGS. 4A-4C.

FIG. 2B shows a further example of the state of the collection of files 122 after the CDP module 114 has backed-up a second version of the data file 108 to the backup location 120, according to embodiments. As shown in FIG. 2B, the second version of the data file 108 may consist of full blocks of data 202A-202G and a tail 202H. The master file 1222 corresponding to the data file 108 now contains the unique data block 204A corresponding to blocks of data 202A and 202D, unique data block 204B corresponding to blocks of data 202B and 202F, unique data block 204C corresponding to block of data 202C, unique data block 204D corresponding to block of data 202E, and unique data block 204E corresponding to block of data 202G in the data file.

The anterior file 1224B corresponding to the second version of the data file 108 contains a list of references 208A-208G indicating that the second version of the data file consists of unique data block 204A, then unique data block 204B, unique data block 204C, unique data block 204A, unique data block 204D, unique data block 204B, and unique data block 204E. The posterior file 1226B corresponding to the second version of the data file 108 contains the tail 202H portion of the data file.

The reference block file 1228 corresponding to the data file 108 now contains a reference count 206A for the first unique data block 204A in the master file 1222 indicating that the unique data block is referenced four times in the anterior files 1224A, 1224B for the two versions of the data file stored in the backup location 120. The reference block file 1228 further contains a reference count 206B indicating that the second unique data block 204B is referenced three times, a reference count 206C indicating that the third unique data block 204C is referenced two times, a reference count 206D indicating that the fourth unique data block 204D is referenced two times, and a reference count 206E indicating that the fifth unique data block 204E is referenced one time in the anterior files 1224A, 1224B for the all the versions of the data file 108 stored in the backup location 120, as further shown in FIG. 2B.

Figure 3:
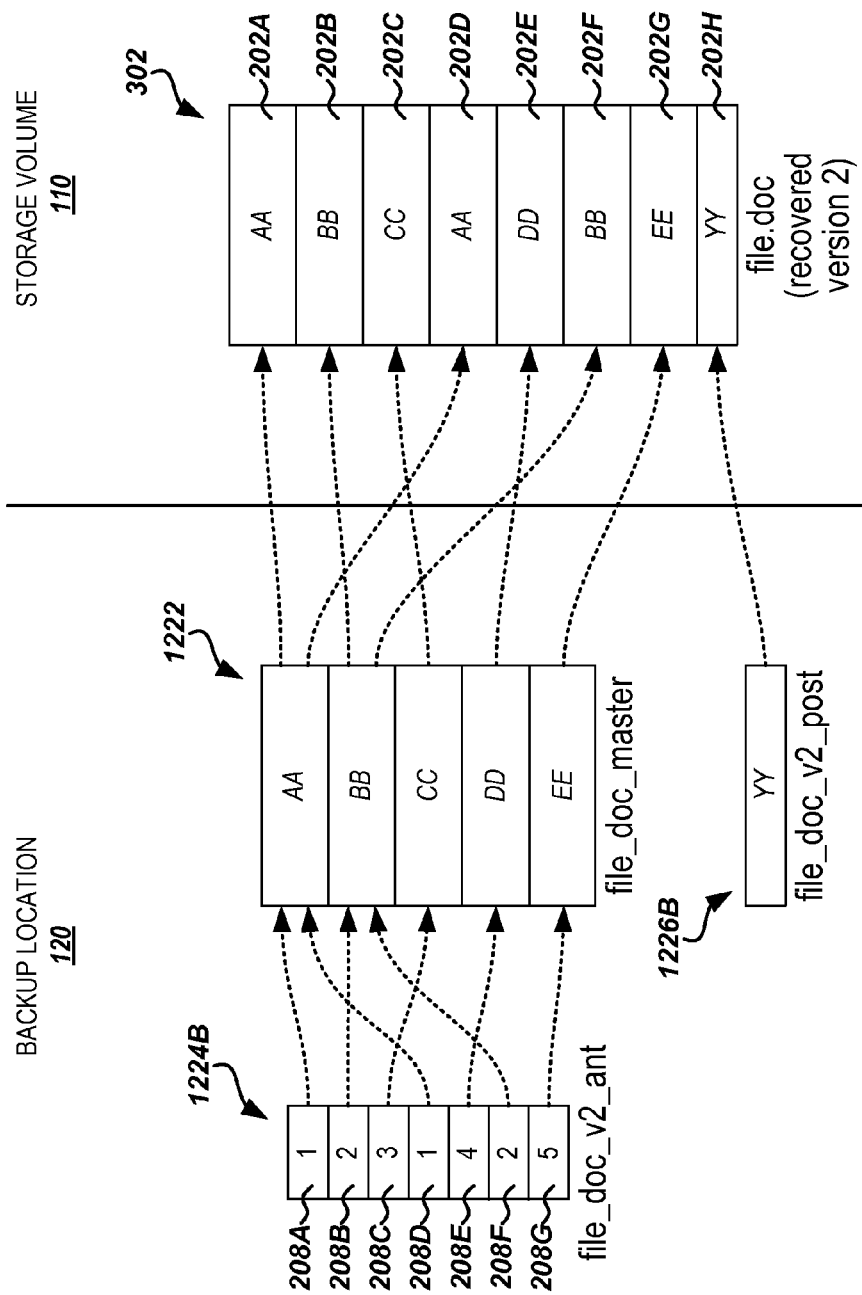
FIG. 3 is a block diagram showing a mechanism for rebuilding a particular version of a data file from a collection of files storing multiple versions of the file, according to embodiments presented herein.

FIG. 3 illustrates how a particular version of the data file 108 may be recovered or restored by the CDP module 114 from the corresponding collection of files 122 maintained in the backup location 120, according to one embodiment. In the illustrated example, the second version of the data file 108 is recovered from the anterior file 1224B and posterior file 1226B corresponding to the version and the master file 1222 corresponding to the data file. The CDP module 114 builds the recovered version of the data file 108 by adding the blocks of data 202A-204G to the data file from unique data blocks in the master file 1222 in the order specified by the list of references 208A-208G contained in the anterior file 1224B. The CDP module 114 then appends the tail 202H to the data file 108 from the posterior file 1226B.

Figure 4A:
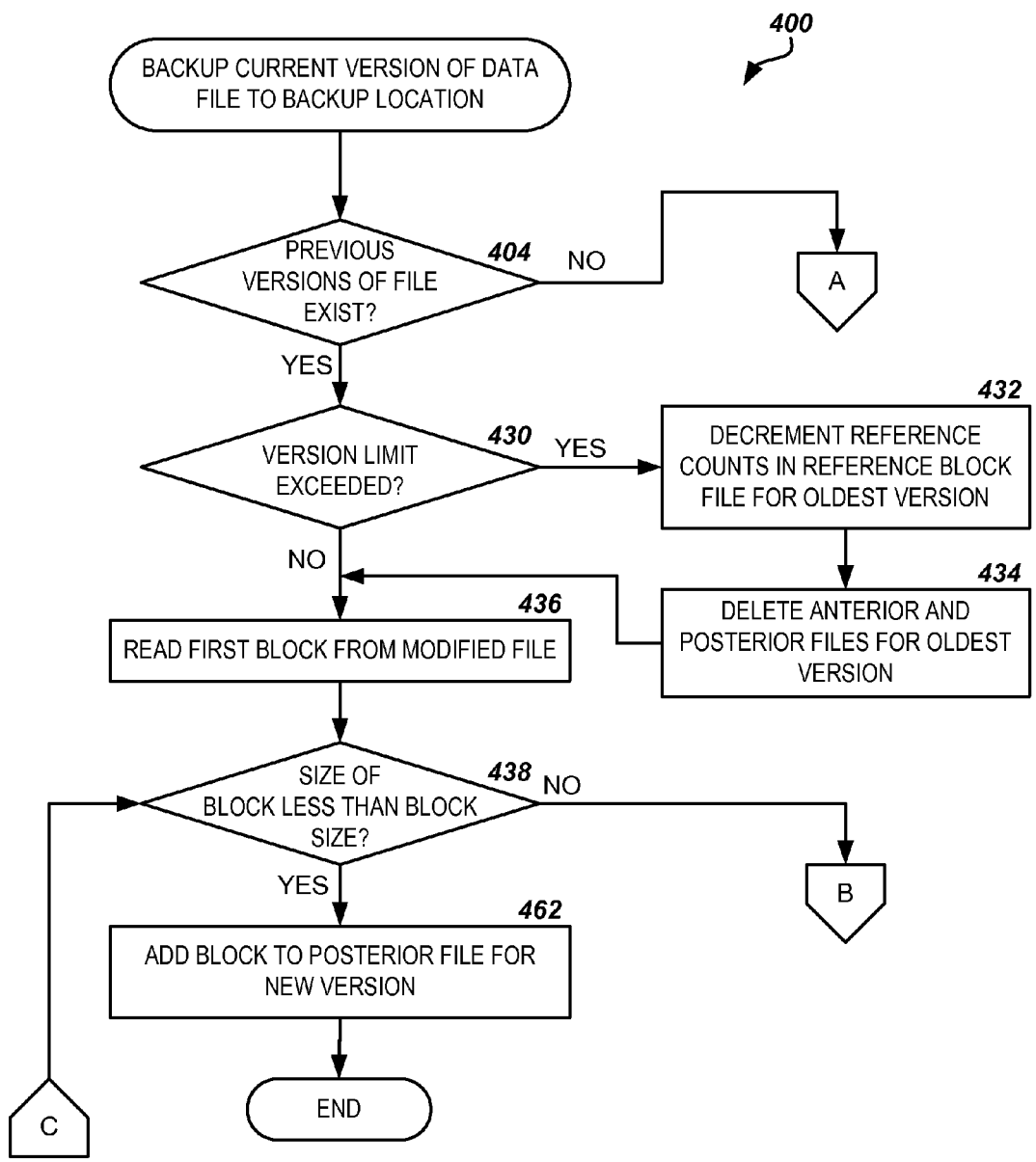
FIGS. 4A-4C are logical flow diagrams illustrating one method for providing efficient backup of multiple versions of a data file using data de-duplication, according to embodiments presented herein.
Figure 4B:
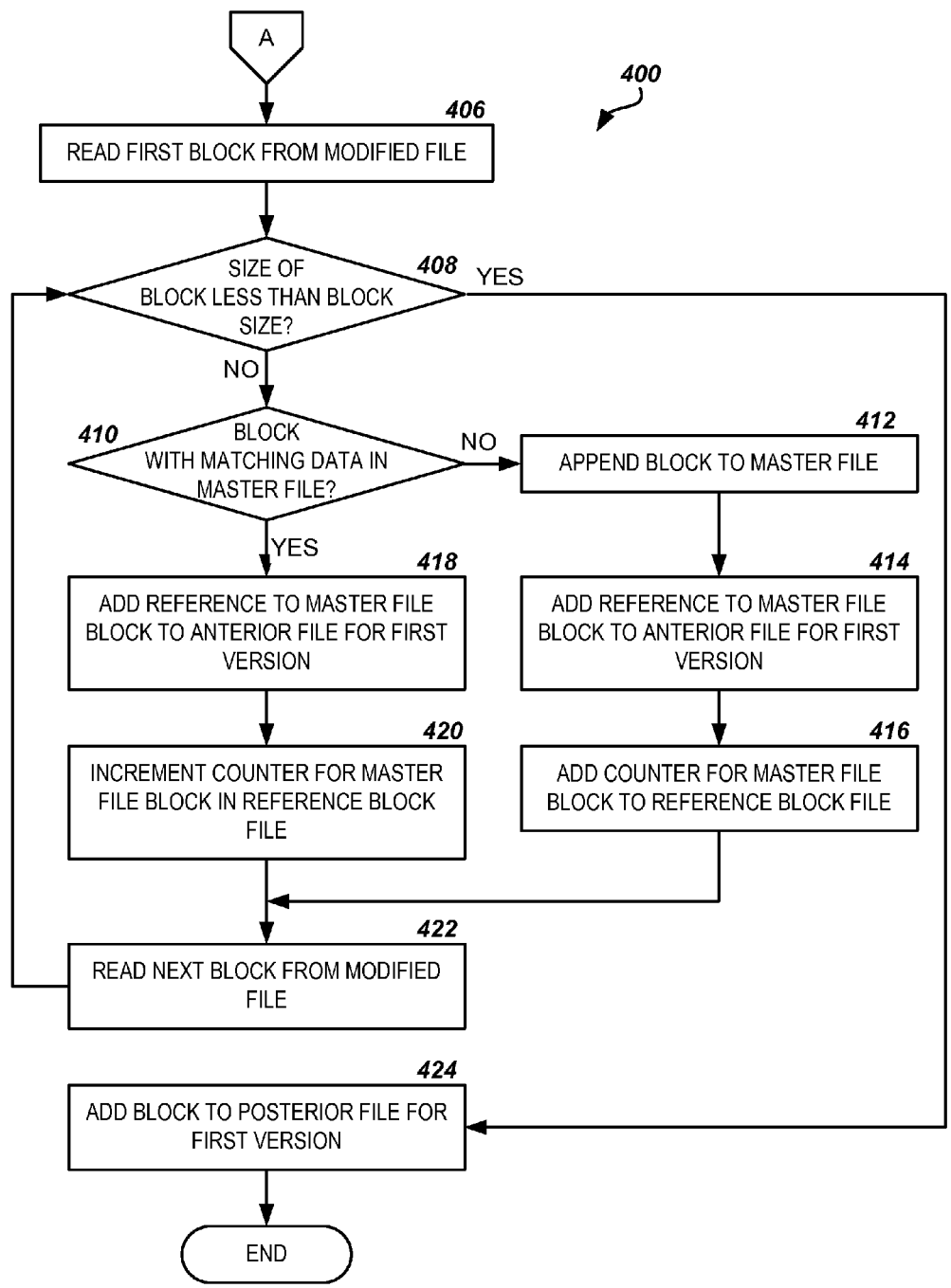
Figure 4C:
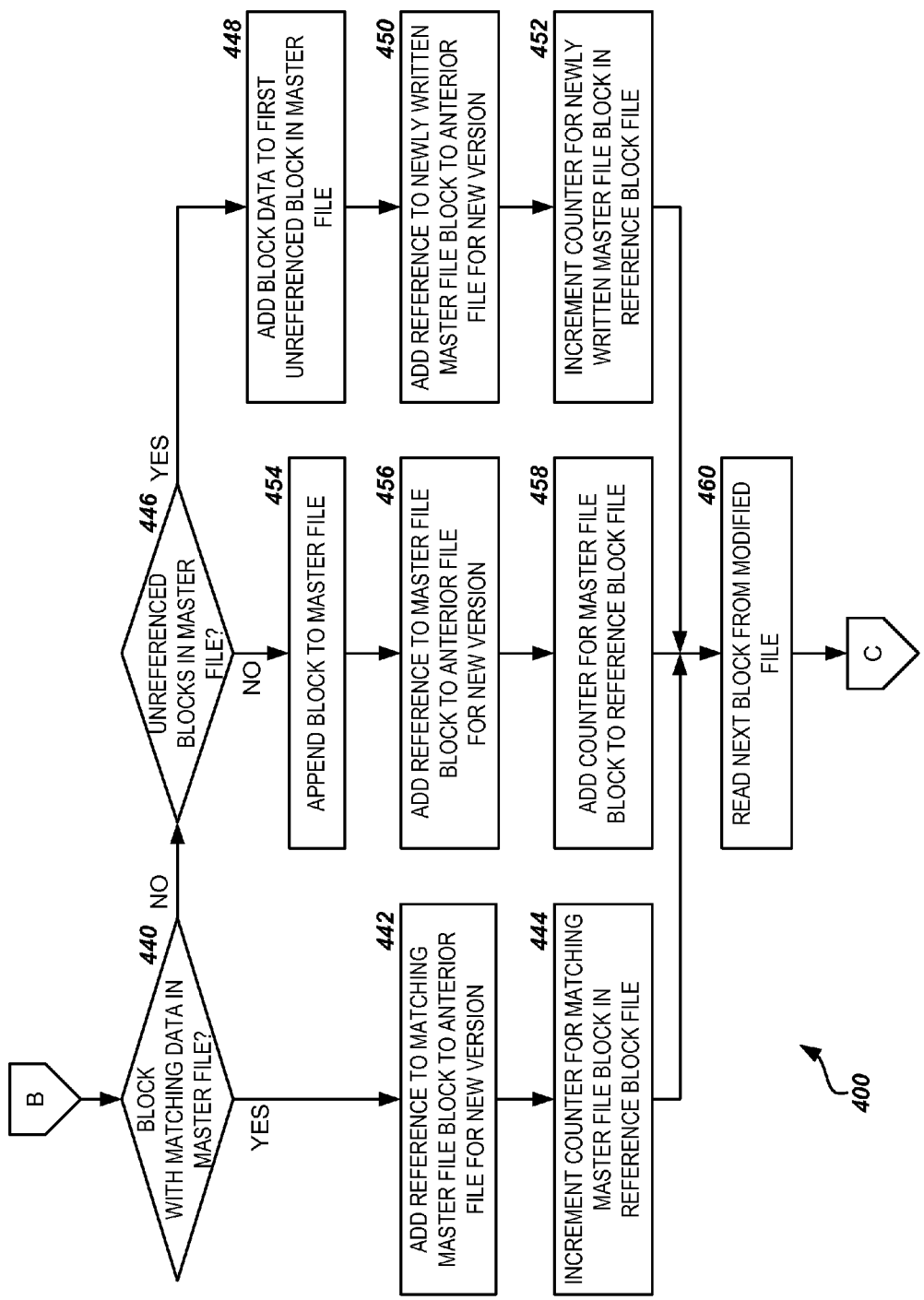

Turning now to FIGS. 4A-4C, additional details will be provided regarding the embodiments presented herein for providing efficient backup of multiple versions of a data file using data de-duplication. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIGS. 4A-4C show a routine 400 for backing up the current version of a data file 108 to the backup location 120, according to one embodiment. The routine 400 may be implemented by the CDP module 114 on the user computer 102, or the routine may performed by another module or a combination of modules executing on the user computer 102 and remote storage systems. In one embodiment, the routine 400 may be executed by the CDP module 114 upon detection of a modification to a monitored data file 108 on the storage volume 110. The modification to the data file 108 may be the result of a user of the user computer 102 saving a file within a local application 104, or the OS 106 modifying the file in the course of operation, for example. As discussed above in regard to FIG. 1, the CDP module 114 may detect the modification to the data file 108 by receiving a message from a hook 116 provided by the OS 106 or by detecting the change to the file through the file system 112 on the user computer 102. In other embodiments, the CDP module 114 may initiate the routine 400 in response to a trigger other than a modification to the data file 108. For example, the CDP module 114 may backup the current version of each monitored data file 108 on the storage volume 110 to the backup location 120 on a periodic basis, regardless of whether the data file has been modified.

As shown in FIG. 4A, the routine 400 begins with operation 404, where the CDP module 114 determines if previous versions of the data file 108 have been stored in a corresponding collection of files 122 in the backup location 120. If no versions of the data file 108 have been previously stored, the routine proceeds from operation 404 to operation 406, where the CDP module 114 reads the first block of data 202A from the modified data file 108, as shown in FIG. 4B. Next, at operation 408, the CDP module 114 checks to see if a full block of data 202A was read from the data file 108, i.e. the size of the read block is not less than the block size.

If the size of the read block is not less than the block size, then the routine 400 proceeds to operation 410, where the CDP module 114 checks to see if a unique data block 204A-

204D already exists in the mater file 1222 matching the read block of data 202A. It will be appreciated that this will not be the case after reading the first block of data 202A from the modified data file 108 when no previous versions of the file are stored in the collection of files 122. However, as additional blocks of data 202B-202E are read from the data file 108, duplicate blocks of data may be found, and the check at operation 410 allows data de-duplication to be applied to the first version of the file stored in the collection of files 122.

In one embodiment, the CDP module 114 performs a simple comparison between the block of data 202A read from the data file 108 and each unique data block 204A-204D in the master file 1222. In another embodiment, the CDP module 114 calculates a hash value for the block of data 202A and compares the hash value to hash values for each of the unique data block 204A-204D in the master file 1222. The hash values for the unique data block 204A-204D may be maintained in a calculated in real time during the comparison, or may be maintained in a cache to improve the speed of the comparison operation. If a unique data block 204A-204D is found with a hash value matching that calculated for the block of data 202A read from the data file 108, the CDP file may further perform a direct comparison of the block of data and the unique data block in order to verify that a matching unique data block exists.

If a matching unique data block 204A-204D does not currently exist in the master file 1222, the routine 400 proceeds from operation 410 to operation 412, where the CDP module 114 appends the read block of data 202A to the master file. The routine 400 then proceeds to operation 414, where the CDP module 114 adds a reference 208A to the newly appended unique data block 204A in the master file 1222 to the anterior file 1224A corresponding to the initial version of the data file 108. Next, the routine 400 proceeds to operation 416, where the CDP module 114 adds a reference count 206A to the reference block file 1228 corresponding to the modified data file 108 indicating that the newly appended unique data block 204A in the master file 1222 is referenced one time. It will be further appreciated that, for the first block of data 202A read from the initial version of the data file 108, the CDP module 114 may be required to create the file structures in the collection of files 122 for the master file 1222, the reference block file 1228, and the anterior file 1224A.

Next, the routine 400 proceeds from operation 416 to operation 422, where the CDP module 114 reads the next block of data 202B from the modified data file 108. From operation 422, the routine 400 returns to operation 408, where the CDP module again checks to see if the read block of data 202B is a full block, i.e. the size of the read block is not less than the block size. If the size of the read block is not less than the block size, then the routine 400 proceeds to operation 410, where the CDP module 114 checks to see if a unique data block 204A-204D already exists in the master file 1222 matching the read block of data 202B. As discussed above, this may be the case when duplicate blocks of data exist in the file.

If a matching unique data block 204A-204D is found in the master file 1222, the routine 400 proceeds from operation 410 to operation 418, where the CDP module 114 adds a reference 208A-208E to the matching unique data block 204A-204D in the master file 1222 to the anterior file 1224A corresponding to the initial version of the data file 108. Next, the routine 400 proceeds to operation 420, where the CDP module 114 increments the reference count 206A-206D in the reference block file 1228 corresponding to the matching unique data block 204A-204D. The routine 400 then proceeds to operation 422, where the CDP module 114 reads the next block of data 202B from the modified data file 108. From operation 422, the routine 400 returns to operation 408, where the CDP module repeats the operations describe above until all the remaining full blocks of data 202B-202E in the initial version of the modified data file 108 have been read and processed.

Once the full blocks of data 202A-202E in the modified data file 108 have been read and processed, the routine 400 reads the tail 202F, from the data file 108 at operation 422, and returns to operation 408, where the CDP module checks to see if the size of the read block of data is less than the block size. Since the tail 202F is less than a full block of data, the routine 400 proceeds from operation 408 to operation 424, where the CDP module 114 writes the tail 202F to the posterior file 1226A corresponding to initial version of the modified data file 108. From operation 424, the routine 400 then ends with the initial version of the modified data file 108 fully backed-up in the collection of files 122 in the backup location 120.

Returning to FIG. 4A, if at operation 404, the CDP module 114 determines previous versions of the data file 108 have been stored in the corresponding collection of files 122 in the backup location 120, the routine proceeds from operation 404 to operation 430, where the CDP module determines whether the number of previous versions stored in the collection of files plus the version being backed-up exceeds the limit of the number of versions to be stored. The version limit may be established by the user and/or an administrator of the user computer 102, for example.

If the version limit will be exceeded, the routine 400 proceeds to operation 432, where the CDP module 114 determines the oldest version of the data file 108 stored in collection of files 122. This may be done by checking the names or timestamps of each anterior file 1224 and/or posterior file 1226 corresponding to the stored versions of the data file 108, for example. Once the oldest version of the data file 108 stored in the collection files is determined, the CDP module 114 then utilizes the anterior file 1224 corresponding to the oldest version to decrement the reference counts 206A-206G in the reference block file 1228 based on the references 208A-208G contained in the anterior file. From operation 432, the routine 400 proceeds to operation 434, where the CDP module 114 deletes the anterior file 1224 and posterior file 1226 corresponding to the oldest version from the collection of files 122 in the backup location 120.

Next, the routine 400 proceeds to operation 436, where the CDP module 114 reads the first block of data 202A from the modified data file 108. The routine 400 proceeds from operation 436 to operation 438, where the CDP module 114 checks to see if a full block of data 202A was read from the data file 108, i.e. the size of the read block is not less than the block size. If the size of the read block is not less than the block size, then the routine 400 proceeds to operation 440, where the CDP module 114 checks to see if a unique data block 204A-204E already exists in the mater file 1222 matching the block of data 202A read from the data file 108, as shown in FIG. 4C.

If a matching unique data block 204A-204E is found in the master file 1222, the routine 400 proceeds from operation 440 to operation 442, where the CDP module 114 adds a reference 208A to the matching unique data block 204A-204E in the master file 1222 to the anterior file 1224B corresponding to the new version of the data file 108. Next, the routine 400 proceeds to operation 444, where the CDP module 114 increments the reference count 206A in the reference block file 1228 corresponding to the matching unique data block 204A-204E.

If, at operation 440, a matching unique data block 204A-204E does not exist in the master file 1222, the routine 400 proceeds to operation 446, where the CDP module 114 determines if there are currently unreferenced unique data blocks stored in the master file. The CDP module 114 scans the reference block file 1228 corresponding to the modified data file 108 to find a reference count 206A-206E with a value of 0. This may be the case if a unique data block 204A-204E was appended to the master file 1222 from a previous version of the data file 108, but was subsequently deleted from the collection of files 122 by the CDP module 114, as described above in regard to operation 432. By first checking for unreferenced unique data blocks 204A-204E in the master file 1222 before appending new unique data block, the CDP module 114 can reuse the space allocated to the unreferenced blocks and keep the overall size of the master file at a minimum.

If an unreferenced unique data block 204A-204E exists in the master file 1222, the routine 400 proceeds from operation 446 to operation 448, where the CDP module 114 copies the data from the block of data 202A read from the data file 108 to the first unreferenced block location in the master file 1222. The routine then proceeds to operation 450, where the CDP module 114 adds a reference 208A to the unreferenced unique data block 204A-204E containing the newly copied data to the anterior file 1224 corresponding to the new version of the data file 108. Next, the routine 400 proceeds to operation 452, where the CDP module 114 increments the reference count 206A in the reference block file 1228 corresponding to the previously unreferenced unique data block 204A-204E.

If, at operation 446, no unreferenced unique data blocks 204A-204E are found in the master file 1222, then the routine 400 proceeds to operation 454, where the CDP module 114 appends the block of data 202A read from the data file 108 to the master file. The routine 400 then proceeds to operation 456, where the CDP module 114 adds a reference 208A to the newly appended unique data block 204A-204E in the master file 1222 to the anterior file 1224A corresponding to the new version of the data file 108. Next, the routine 400 proceeds to operation 458, where the CDP module 114 adds a reference count 206A to the reference block file 1228 corresponding to the modified data file 108 indicating that the newly appended unique data block 204A-204E in the master file 1222 is referenced one time.

From operations 444, 452, and 458, the routine 400 proceeds to operation 460, where the CDP module 114 reads the next block of data 202B from the modified data file 108. From operation 460, the routine 400 returns to operation 438, shown in FIG. 4A, where the CDP module repeats the operations 438-460 until all the remaining full blocks of data 202B-202G in the new version of the modified data file 108 have been read and processed. Once all the full blocks of data 202B-202G in the modified data file 108 have been processed, the routine 400 reads the tail 202H from the data file at operation 460, and returns to operation 438, where the CDP module checks to see if the size of the read block of data is less than the block size. Since the size of the tail 202H is less than the block size, the routine 400 proceeds to operation 462, where the CDP module 114 writes the tail 202H to the posterior file 1226B corresponding to new version of the modified data file 108. From operation 424, the routine 400 then ends with the new version of the modified data file 108 fully backed-up in the collection of files 122 in the backup location 120.

Figure 5:
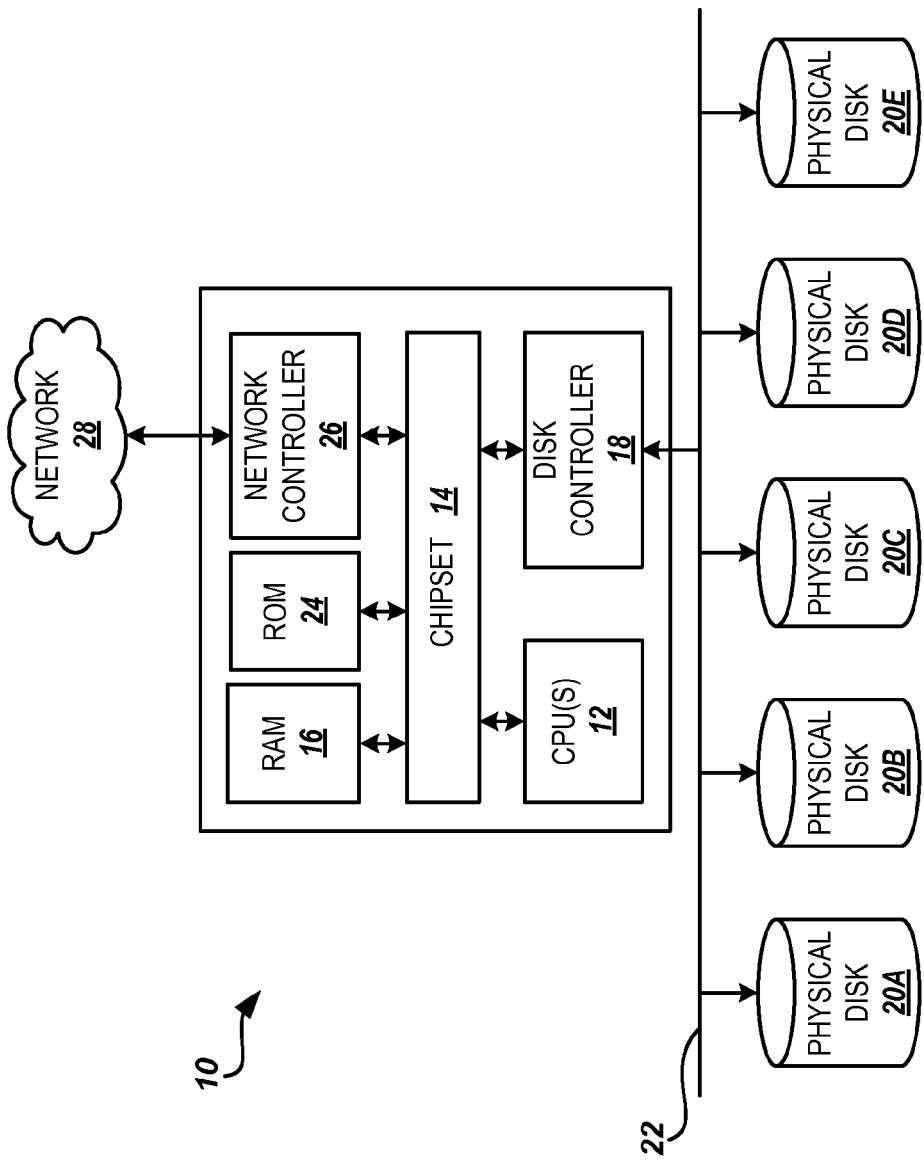
FIG. 5 is a computer architecture diagram illustrating a computer hardware architecture for a computing system capable of implementing aspects of the embodiments presented herein.

FIG. 5 and the following discussion are intended to provide a brief, general description of a suitable computing environment in which the embodiments described herein may be implemented. Those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments, where tasks are performed by remote processing devices that are linked through a communications network. In a distributed computing environment, program modules may be located in both local and remote memory storage devices.

In particular, FIG. 5 shows an illustrative computer system 10 for the user computer 102 described above in regard to FIG. 1. In one illustrative embodiment, one or more central processing units ("CPUs") 12 operate in conjunction with a chipset 14. The CPUs 12 are standard programmable processors that perform arithmetic and logical operations necessary for the operation of the computer system 10.

The CPUs 12 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 14 provides an interface between the CPUs 12 and the remainder of the computer system 10. The chipset 14 also provides an interface to a random access memory ("RAM") 16 used as the main memory in the computer system 10. The chipset 14 also includes functionality for providing network connectivity through a network controller 26, such as a gigabit Ethernet adapter. The network controller 26 is capable of connecting the computer system 10 to remote storage systems or other computing devices over a network 28. The network 28 may be an Ethernet or Gigabyte Ethernet LAN, a fiber ring, a fiber star, wireless, optical, satellite, a WAN, a MAN, or any other network technology, topology, protocol, or combination thereof.

The computer system 10 is further connected to a number of mass storage devices, such as physical disks 20A-20E shown in FIG. 5. The disks 20A-20E provide the data storage capacity required for the computer system 10 to store data files 108, described above in regard to FIG. 1. A disk controller 18 allows the computer system 10 to communicate with the disks 20A-20E connected to the storage node. According to embodiments, the disks 20A-20E may be connected to the computer system 10 through a bus 22 that allows the disk controller 18 to communicate with the disk drives. The disk controller 18 may interface with the disks 20A-20E through a serial advanced technology attachment ("SATA") interface, a small computer system interface ("SCSI"), a fiber channel ("FC") interface, a serial attached SCSI interface, or other standard interface for physically connecting and transferring data between computers and storage devices. In addition, the disk controller 18 may include hardware-level RAID services.

The computer system 10 may store data on the disks 20A-20E by transforming the physical state of the disk to reflect the information being stored. The specific transformation of physical state may depend on various factors, in different implementations of this description. Examples of such factors may include, but are not limited to, the technology used to implement the storage devices, whether the storage devices are characterized as primary or secondary storage, and the like. For example, the computer system 10 may store data to the disks 20A-20E by issuing instructions to the disk controller 18 to alter the magnetic characteristics of particular locations within the physical disk drives. These transformations may also include altering the physical features or characteristics of other media types, including altering the reflective or refractive characteristics of a particular location in an optical storage device, or modifying the electrical characteristics of a particular capacitor, transistor, or other discrete component in a solid-state storage device. Other transformations of physical media are possible without departing from the scope and spirit of the present description, with the foregoing examples provided only to facilitate this discussion. The computer system 10 may further read information from the physical disks 20A-20E by detecting the physical states or characteristics of one or more particular locations within the devices.

In addition to the disks 20A-20E described above, the computer system 10 may have access to other computer-readable storage medium to store and retrieve information, such as program modules, data structures, or other data. It should be appreciated by those skilled in the art that computer-readable storage media can be any available media that can be accessed by the computer system 10. By way of example, and not limitation, computer-readable storage media may include volatile and non-volatile, removable and non-removable media implemented in any method or technology for. Computer-readable storage media includes, but is not limited to, RAM, ROM, EPROM, EEPROM, flash memory or other solid-state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer system 10.

The computer-readable storage media may store the OS 106 utilized to control the operation of the computer system 10. According to one embodiment, the operating system 106 comprises the WINDOWS® operating system from MICROSOFT Corporation of Redmond, Wash. According to further embodiments, the operating system may comprise the LINUX, UNIX, or SOLARIS operating systems. It should be appreciated that other operating systems may also be utilized. The computer-readable storage media may store other system or application programs, such as the local applications 104 or CDP module 114 described above, as well as other data files utilized by the computer system 10. In one embodiment, the computer-readable storage medium may be encoded with computer-executable instructions that, when loaded into the computer system 10, may transform the computer system from a general-purpose computing system into special-purpose computer capable of implementing the embodiments described herein. The computer-executable instructions may be encoded on the computer-readable storage medium by altering the electrical, optical, magnetic, or other physical characteristics of particular locations within the media. These computer-executable instructions transform the computer system 10 by specifying how the CPUs 12 transitions between states, as described above. According to one embodiment, the computer system 10 may have access to computer-readable storage media storing computer-executable instructions that, when executed by the computer system, perform the routine 400 for providing efficient backup of multiple versions of a data file using data de-duplication, described above in regard to FIGS. 4A-4C.

The chipset 14 may also provide an interface to a computer-readable storage medium such as a ROM 24 or NVRAM for storing a firmware that includes program code containing the basic routines that help to start up the computer system 10 and to transfer information between elements within the computer system 10. The ROM 24 or NVRAM may also store other software components necessary for the operation of the computer system 10 in accordance with the embodiments described herein. It will be appreciated that the computer system 10 may not include all of the components shown in FIG. 5, may include other components that are not explicitly shown in FIG. 5, or may utilize an architecture completely different than that shown in FIG. 5.

Based on the foregoing, it should be appreciated that technologies for providing efficient backup of multiple versions of a data file using data de-duplication are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method of backing-up a version of a data file, the method comprising:
    copying one or more unique data blocks of a specific block size from the data file to a master file corresponding to the data file;
    creating an anterior file corresponding to the version of the data file containing an ordered list of references to the one or more unique data blocks of the specific block size in the master file, wherein the ordered list of references is based on the order of occurrence of each unique data block in the version of the data file;
    writing a last block of data in the data file to a posterior file corresponding to the version of the data file, the last block of data being a portion of the data file less than the specific block size; and
    maintaining a reference count for each of the one or more unique data blocks in the master file in a reference block file corresponding to the data file, wherein the reference count for each unique data block indicates a number of times the unique data block is referenced in all anterior files corresponding to all backed-up versions of the data file, wherein copying one or more unique data blocks of a specific block size from the data file to a master file corresponding to the data file comprises copying at least one data block from the data file to a unique data block location in the master file having a corresponding reference count in the reference block file with a value of zero, and wherein the unique data block location is a previously allocated portion of the master file storing a unique block of data associated with a deleted version of the data file.

2. The computer-implemented method of claim 1, wherein the data file is stored in a storage volume and the master file, the anterior file, and the posterior file are maintained in a backup location.

3. The computer-implemented method of claim 2, wherein multiple versions of the data file are stored in the backup location in a single master file corresponding to the data file and in a plurality of anterior files and posterior files corresponding to individual versions of the data file.

4. The computer-implemented method of claim 2, wherein a plurality of anterior files corresponding to individual versions of the data file contain a reference to the same unique data block in the master file.

5. The computer-implemented method of claim 1, wherein the version of the data file is backed-up in response to detecting that the data file has been modified.

6. A non-transitory computer-readable storage medium having computer-executable instructions stored thereon that, when executed by a computer, cause the computer to:
   read a block of data from a current version of a data file;
   determine if the size of the block of data is less than a block size;
   upon determining that the block of data is not less than the block size, determine if a unique data block having matching data exists in a master file corresponding to the data file;
   upon determining that a unique data block having matching data exists in the master file, append a reference to the unique block having matching data in the master file to an anterior file corresponding to the current version of the data file;
   upon determining that a unique data block having matching data does not exist in the master file, append the block of data to the master file and append a reference to the appended block of data in the master file to the anterior file corresponding to the current version of the data file;
   upon determining that the block of data is less than the block size, write the block of data to a posterior file corresponding to the current version of the data file, the last block of data being a portion of the data file less than the block size;
   maintain a reference count for each of the unique data blocks in the master file in a reference block file corresponding to the data file, wherein the reference count for each unique data block indicates a number of times the unique data block is referenced in all anterior files corresponding to all backed-up versions of the data file;
   upon determining that a unique data block having matching data does not exist in the master file, determine if a unique data block location having a corresponding reference count in the reference block file with a value of zero exists in the master file; and
   upon determining that a unique data block location having a corresponding reference count with a value of zero exists in the master file, copy the data from the block of data to the unique data block location, append a reference to the unique data block location to the anterior file corresponding to the current version of the data file, and increment the reference count corresponding to the unique data block location in the reference block file, wherein the unique data block location is a previously allocated portion of the master file storing a unique block of data associated with a deleted version of the data file.

7. The non-transitory computer-readable storage medium of claim 6, wherein the steps are repeated until all blocks of data in the current version of the data file have been processed.

8. The non-transitory computer-readable storage medium of claim 6, wherein the data file is stored in a storage volume and the master file, the anterior file, and the posterior file are maintained in a backup location.

9. The non-transitory computer-readable storage medium of claim 8, wherein multiple versions of the data file are backed-up to the backup location in a single master file corresponding to the data file and in a plurality of anterior files and posterior files corresponding to individual versions of the data file.

10. The non-transitory computer-readable storage medium of claim 9, wherein a plurality of anterior files corresponding to individual versions of the data file contain a reference to the same unique data block in the master file.

11. The non-transitory computer-readable storage medium of claim 6 having further computer-executable instructions stored thereon that cause the computer to:
   determine if a number of versions of the data file backed-up to the backup location exceed a version limit;
   upon determining that the number of versions of the data file backed-up to the backup location exceed the version limit, decrement the reference counts in the reference block file corresponding to the data file based on the references contained in the anterior file corresponding to an oldest version of the data file on the backup location; and
   delete the anterior file and posterior file corresponding to the oldest version of the data file from the backup location.

12. A system for backing-up multiple versions of a data file stored on a storage volume to a backup location, the system comprising:
   a user computer comprising a processor and a memory operatively coupled to the processor; and
   a continuous data protection ("CDP") module executing in the processor from the memory and that, when executed by the processor, causes the user computer to:
      detect a modification to the data file stored on the storage volume,
      copy one or more unique data blocks of a specific block size from a current version of the data file to a master file corresponding to the data file in the backup location,
      create an anterior file in the backup location for the current version of the data file containing an ordered list of references to the one or more unique data blocks of the specific block size in the master file, wherein the ordered list of references is based on the order of occurrence of each unique data block in the current version of the data file,
      write a last block of data in the data file to a posterior file corresponding to the current version of the data file, wherein the last block of data is a portion of the data file less than the specific block size, and the posterior file is maintained in the backup location, and
      maintain a reference count for each of the one or more unique data blocks in the master file in a reference block file corresponding to the data file, wherein the reference count for each unique data block indicates a number of times the unique data block is referenced in all anterior files corresponding to all backed-up versions of the data file, wherein copying one or more unique data blocks of a specific block size from the data file to a master file corresponding to the data file comprises copying at least one data block from the data file to a unique data block location in the master file having a corresponding reference count in the reference block file with a value of zero, and wherein the unique data block location is a previously allocated portion of the master file storing a unique block of data associated with a deleted version of the data file.

13. The system of claim 12, wherein multiple versions of the data file are backed-up to the backup location in a single master file corresponding to the data file and in a plurality of anterior files and posterior files corresponding to individual versions of the data file.

14. The system of claim 13, wherein a plurality of anterior files corresponding to individual versions of the data file contain a reference to the same unique data block in the master file.

* * * * *